United States Patent
Strushensky et al.

(10) Patent No.: US 11,959,261 B2
(45) Date of Patent: Apr. 16, 2024

(54) WATER TEMPERATURE CONTROL ASSEMBLY

(71) Applicants: Marsha Strushensky, Johnstown, PA (US); David Strushensky, Johnstown, PA (US)

(72) Inventors: Marsha Strushensky, Johnstown, PA (US); David Strushensky, Johnstown, PA (US)

( * ) Notice: Subject to any disclaimer, the term of this patent is extended or adjusted under 35 U.S.C. 154(b) by 0 days.

(21) Appl. No.: 15/883,144

(22) Filed: Jan. 30, 2018

(65) Prior Publication Data

US 2019/0234054 A1    Aug. 1, 2019

(51) Int. Cl.
| | | |
|---|---|---|
| *E03C 1/02* | (2006.01) | |
| *B05B 1/18* | (2006.01) | |
| *B05B 12/00* | (2018.01) | |
| *E03C 1/04* | (2006.01) | |
| *E03C 1/05* | (2006.01) | |

(52) U.S. Cl.
CPC ............. *E03C 1/025* (2013.01); *B05B 1/18* (2013.01); *B05B 12/002* (2013.01); *B05B 12/004* (2013.01); *E03C 1/0408* (2013.01); *E03C 1/0409* (2013.01); *E03C 1/055* (2013.01); *E03C 1/041* (2013.01); *E03C 2001/0418* (2013.01)

(58) Field of Classification Search
CPC ................................. E03C 1/055; E03C 1/057
USPC .......................................................... 4/615
See application file for complete search history.

(56) References Cited

U.S. PATENT DOCUMENTS

| 4,042,984 | A | * | 8/1977 | Butler ................... A47K 3/001 137/624.11 |
| 4,945,943 | A | * | 8/1990 | Cogger .............. G05D 23/1393 137/360 |
| D327,729 | S | | 7/1992 | Rogers |
| 5,160,197 | A | | 11/1992 | Klose |
| 6,186,988 | B1 | | 2/2001 | Sabacinski et al. |
| 6,264,121 | B1 | | 7/2001 | McClary |
| 6,892,952 | B2 | * | 5/2005 | Chang ................... E03C 1/0409 236/12.12 |
| 6,989,514 | B2 | | 1/2006 | Patterson et al. |
| D560,754 | S | * | 1/2008 | Nobili ......................... D23/223 |
| 7,979,928 | B2 | * | 7/2011 | Allen, Jr. .................. E03C 1/057 4/623 |
| 9,050,612 | B2 | | 6/2015 | Miller et al. |
| 9,552,706 | B2 | | 1/2017 | Schneider, II et al. |
| 2005/0072850 | A1 | * | 4/2005 | Cornwall ................. E03C 1/055 236/12.15 |
| 2006/0203880 | A1 | * | 9/2006 | Batcho ..................... G01K 3/08 374/147 |
| 2007/0001018 | A1 | * | 1/2007 | Schmitt .................... E03C 1/05 236/12.12 |
| 2007/0018019 | A1 | * | 1/2007 | Nobili ................... B05B 12/004 239/581.1 |
| 2013/0239321 | A1 | * | 9/2013 | Reeder ................... E03C 1/055 4/615 |

* cited by examiner

*Primary Examiner* — Erin Deery

(57) ABSTRACT

A water temperature control assembly for remotely controlling water temperature in a shower includes a control unit that is attached to a fluid valve in a shower to adjust a temperature of water that is delivered from the fluid valve. A showerhead is provided and the showerhead is fluidly coupled to the fluid valve in the shower for bathing. The showerhead is in wireless electrical communication with the control unit to remotely control the temperature of the water.

5 Claims, 4 Drawing Sheets

WATER TEMPERATURE CONTROL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to control devices and more particularly pertains to a new control device for remotely controlling water temperature in a shower.

BRIEF SUMMARY OF THE INVENTION

An embodiment of the disclosure meets the needs presented above by generally comprising a control unit that is attached to a fluid valve in a shower to adjust a temperature of water that is delivered from the fluid valve. A showerhead is provided and the showerhead is fluidly coupled to the fluid valve in the shower for bathing. The showerhead is in wireless electrical communication with the control unit to remotely control the temperature of the water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
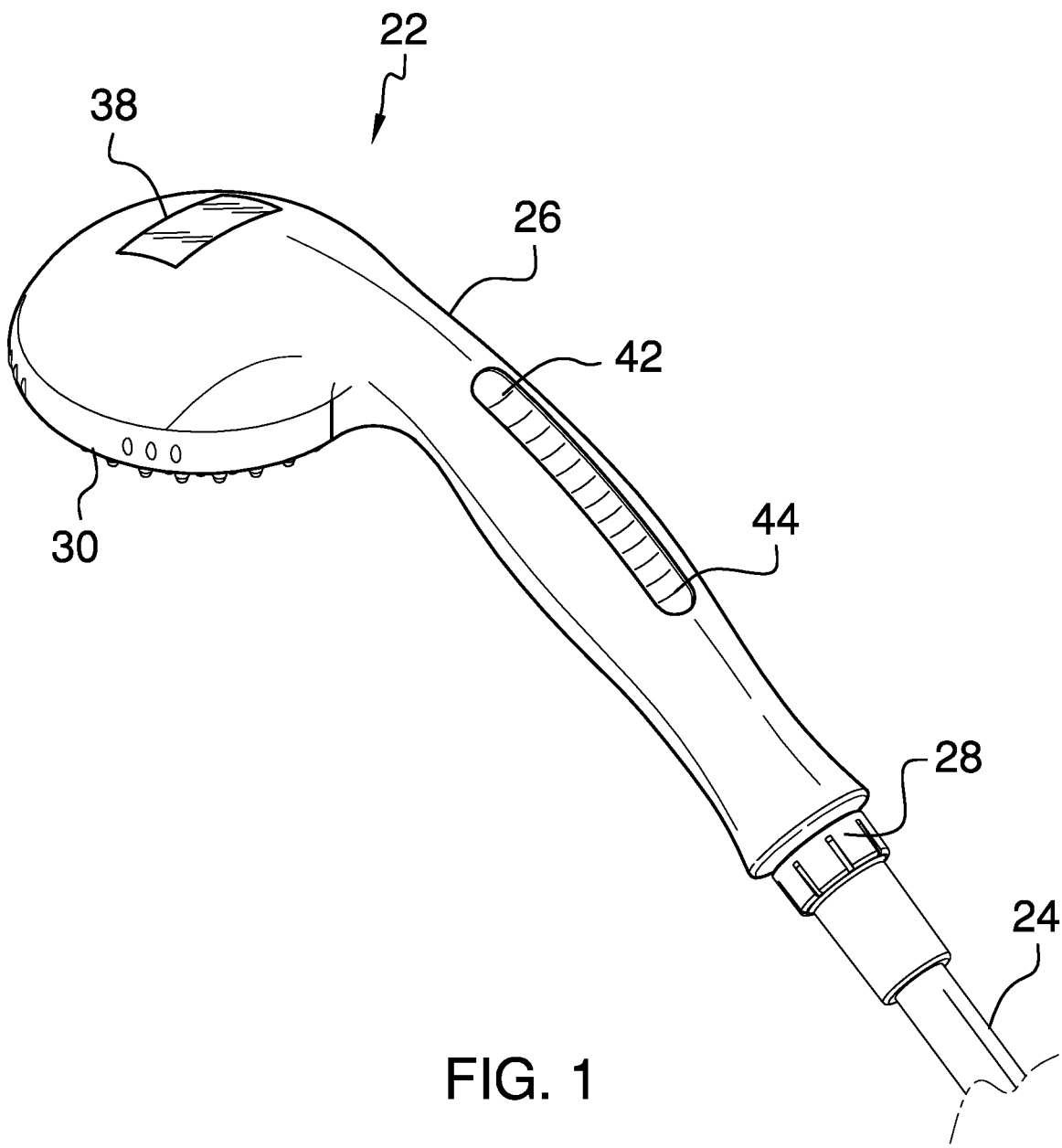
FIG. 1 is a perspective view of a water temperature control assembly according to an embodiment of the disclosure.
Figure 2:
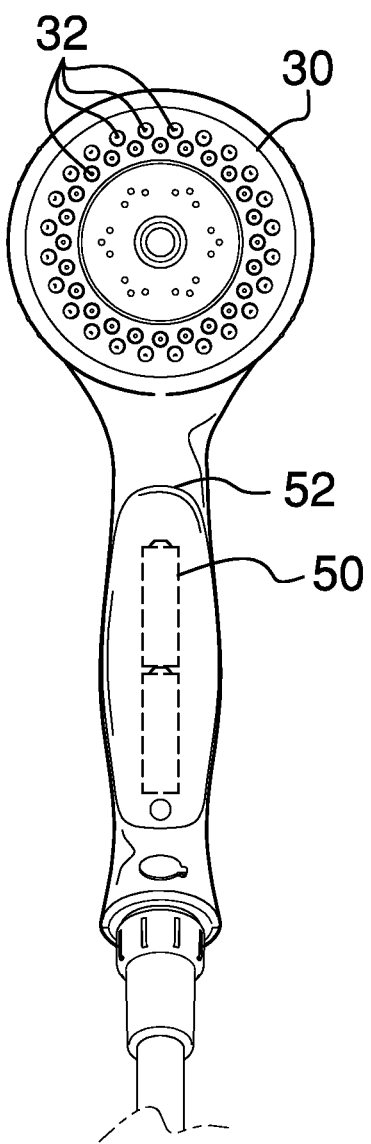
FIG. 2 is a bottom phantom view of an embodiment of the disclosure.
Figure 3:
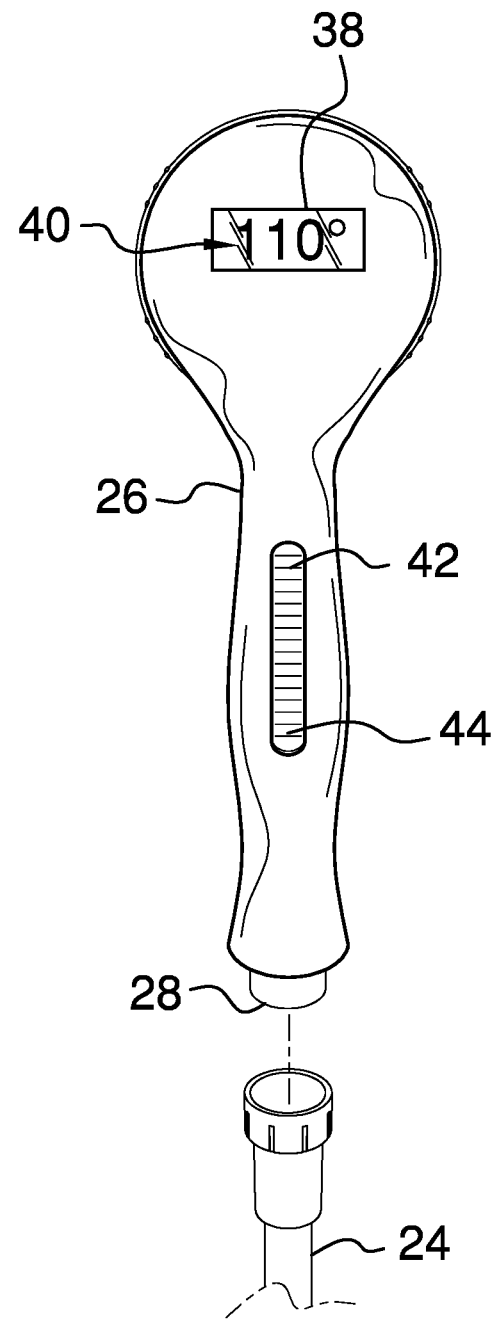
FIG. 3 is a top exploded view of an embodiment of the disclosure.
Figure 4:
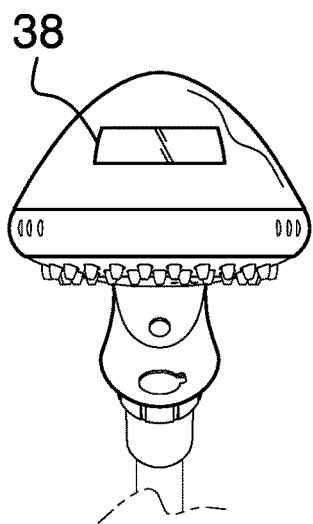
FIG. 4 is a front view of an embodiment of the disclosure.
Figure 5:
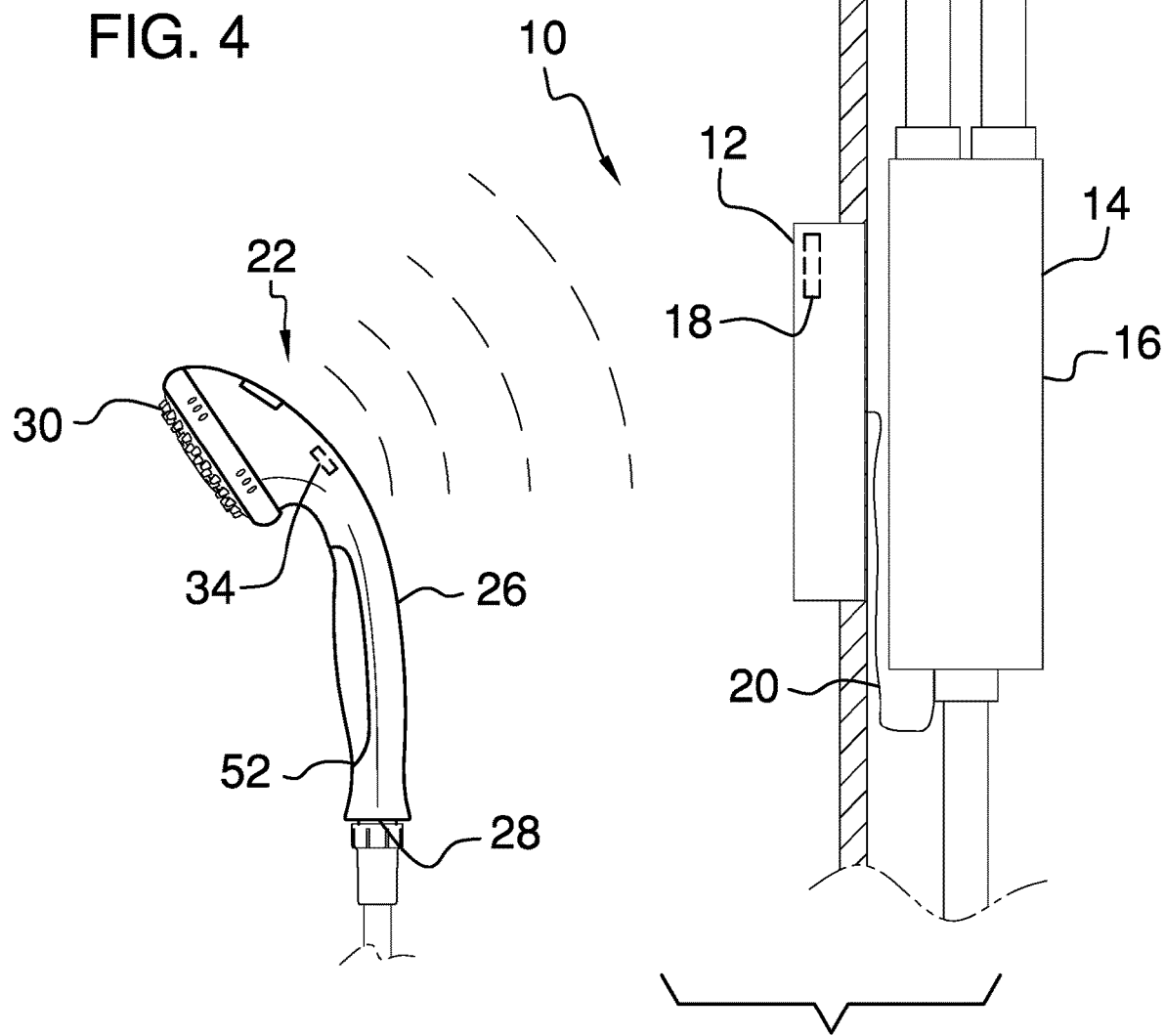
FIG. 5 is a perspective in-use view of an embodiment of the disclosure.
Figure 6:
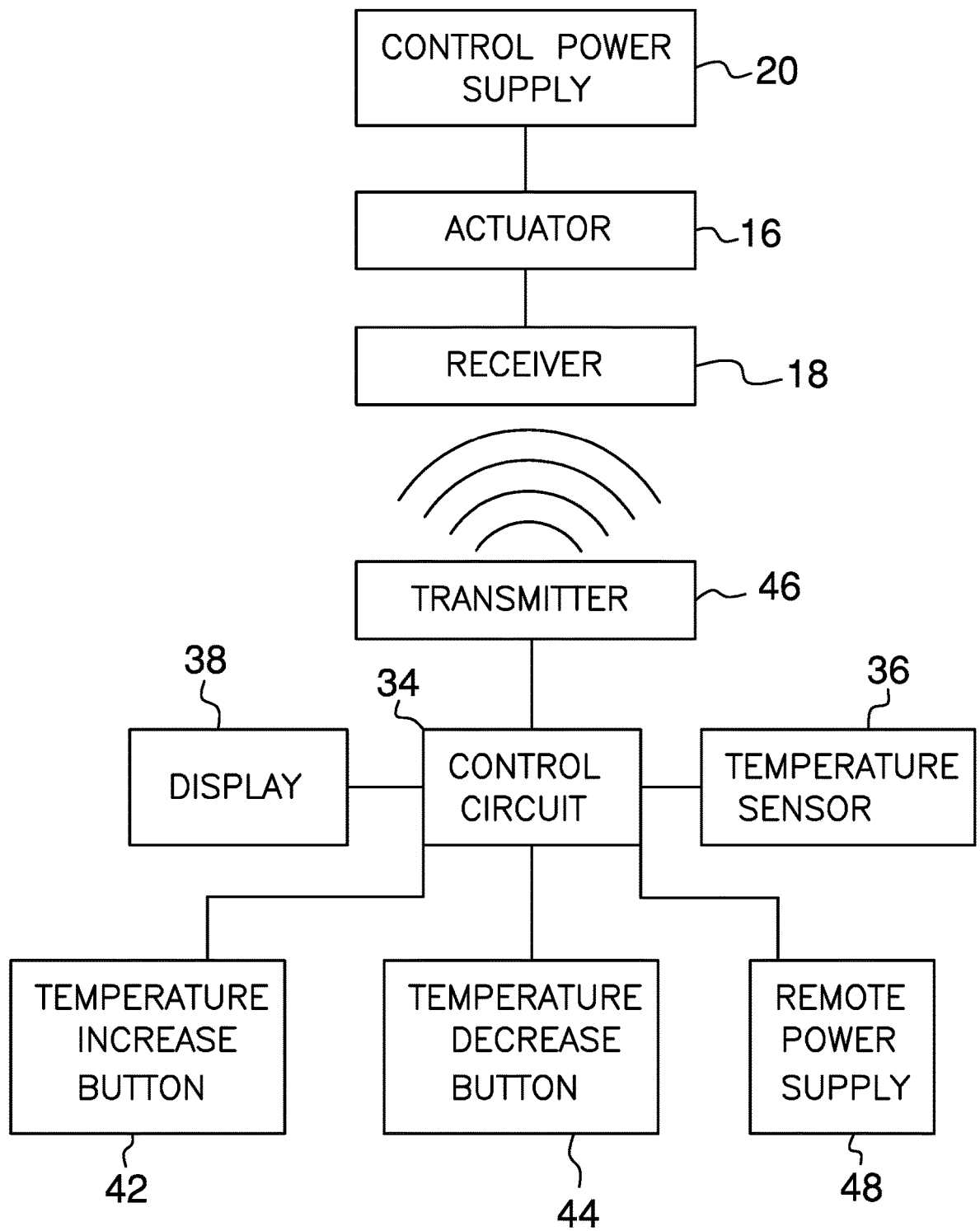
FIG. 6 is a schematic view of an embodiment of the disclosure.

With reference now to the drawings, and in particular to FIGS. 1 through 6 thereof, a new control device embodying the principles and concepts of an embodiment of the disclosure and generally designated by the reference numeral 10 will be described.

As best illustrated in FIGS. 1 through 6, the water temperature control assembly 10 generally comprises a control unit 12 that may be attached to a fluid valve 14 in a shower. The control unit 12 adjusts a temperature of water that is delivered from the fluid valve 14. The fluid valve 14 may be a shower valve of any conventional design. The control unit 12 comprises an actuator 16 that is attached to the fluid valve 14. The actuator 16 is turned on to actuate in a first direction to increase the temperature of the water that is delivered from the fluid valve 14. The actuator 16 is turned on to actuate in a second direction to decrease the temperature of the water delivered from the fluid valve 14. The actuator 16 may be an electrical actuator 16 or the like that is common to remote shower controls.

A receiver 18 is coupled to the control unit 12 and the receiver 18 is electrically coupled to the actuator 16. The receiver 18 may be a radio frequency receiver 18 or the like and the receiver 18 may employ a WPAN signal and Bluetooth communication protocols. A control power supply 20 is electrically coupled to the actuator 16 and the receiver 18 and the control power supply 20 comprises an electrical system in a building. The control unit 12, and all of the components contained therein, may be a wireless, electronic shower control unit of any conventional design.

A showerhead 22 is provided and the showerhead 22 is fluidly coupled to the fluid valve 14 in the shower for bathing. The showerhead 22 includes a flexible hose 24 that is fluidly coupled between the showerhead 22 and the fluid valve 14. Thus, the showerhead 22 may be held by a caregiver bathing an elderly person, a hairstylist washing a customer's hair and any other user with a need for a hand-held showerhead 22. Moreover, the showerhead 22 is in wireless electrical communication with the control unit 12 to remotely control the temperature of the water.

The showerhead 22 comprises a body 26 that has a first end 28 and a second end 30. The first end 28 is fluidly coupled to the fluid hose 24. The second end 30 has a plurality of apertures 32 extending therethrough to release fluid from the supply hose 24 outwardly therefrom for bathing. The body 26 of the showerhead 22 may be structured to resemble any conventional, handheld showerhead 22.

A control circuit 34 is provided and the control circuit 34 is coupled to the body 26. A temperature sensor 36 is coupled to the body 26 and the temperature sensor 36 is in fluid communication with the fluid for detecting a temperature of the fluid. The temperature sensor 36 is electrically coupled the control circuit 34 and the temperature sensor 36 may be an electronic thermostat or the like. A display 38 is coupled to the body 26 and display 38 is electrically coupled to the control circuit 34. The display 38 displays indicia 40 comprising numbers for indicating a temperature of the fluid. Moreover, the display 38 may be a water proof LCD or the like.

A temperature increase button 42 is coupled to the body 26 and the temperature increase button 42 is electrically coupled to the control circuit 34. The temperature increase button 42 is fluidly sealed with the body 26 to inhibit the fluid from damaging the temperature increase button 42. A temperature decrease button 44 is coupled to the body 26 and the temperature decrease button 44 is electrically coupled the control circuit 34. The temperature decrease button 44 is fluidly sealed with the body 26 to inhibit the fluid from damaging the temperature decrease button 44.

A transmitter 46 is coupled to the body 26 and the transmitter 46 is electrically coupled to the control circuit 34. The transmitter 46 is in wireless electrical communication with the receiver 18. The transmitter 46 communicates an increase signal to the receiver 18 when the temperature increase button 42 is manipulated. Thus, the actuator 16 is remotely turned on to actuate in the first direction and increase the temperature of the water. The transmitter 46 communicates a decrease signal to the receiver 18 when the temperature decrease button 44 is manipulated. Thus, the actuator 16 is turned on to actuate in the second direction and decrease the temperature of the water. The transmitter 46 may be a radio frequency transmitter 46 or the like and the transmitter 46 may employ a WPAN signal and Bluetooth communication protocols.

A remote power supply 48 is positioned within the body 26 and the remote power supply 48 is electrically coupled to the control circuit 34. The remote power supply 48 comprises at least one battery 50. A battery cover 52 is removably coupled to the body 26 and the power supply is positioned beneath the battery cover 52. Additionally, the battery cover 52 forms a fluid impermeable seal with the body 26 when the battery cover 52 is attached to the body 26.

In use, the showerhead 22 is gripped during bathing. The temperature sensor 36 senses the temperature of the water flowing through the showerhead 22 and the display 38 displays the temperature of the water. Each of the temperature increase button 42 and the temperature decrease button 44 are manipulated to adjust the temperature of the water. In this way the temperature of the water is remotely controlled to assist a caregiver, a hairstylist and other user with controlling the temperature of the water when the fluid valve 14 is out of reach.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A water temperature control assembly comprising:
a control unit being configured to be attached to a fluid valve in a shower such that said control unit adjusts a temperature of water being delivered from the fluid valve, said control unit comprising
an actuator being configured to be attached to the fluid valve, said actuator being turned on in a first direction wherein said actuator is configured to increase the temperature of the water delivered from the fluid valve, said actuator being turned on in a second direction wherein said actuator is configured to decrease the temperature of the water delivered from the fluid valve, and
a receiver, said receiver being electrically coupled to said actuator; and
a showerhead being configured to be fluidly coupled to the fluid valve in the shower for bathing, said showerhead being in wireless electrical communication with said control unit wherein said showerhead is configured to remotely control the temperature of the water, said showerhead comprising
a body having a first end and a second end, said first end being configured to be fluidly coupled to a supply hose of the fluid valve, said second end having a plurality of apertures extending therethrough wherein said plurality of apertures is configured to release the water from the supply hose outwardly therefrom for bathing, said body defining an elongated handle portion between said first end and said second end wherein said body is configured for being grasped,
a control circuit being coupled to said body,
a temperature sensor being coupled to said body wherein said temperature sensor is configured to be in fluid communication with the water for detecting the temperature of the water, said temperature sensor being electrically coupled said control circuit,
a temperature increase button being coupled to said body, said temperature increase button being electrically coupled to said control circuit,
a temperature decrease button being coupled to said body, said temperature decrease button being electrically coupled said control circuit, each of said temperature increase button and said temperature decrease button being positioned on said handle portion in linear alignment parallel to a longitudinal central axis of said handle portion wherein each of said temperature increase button and said temperature decrease button are configured to be manipulated by a hand while grasping said handle portion, said temperature increase button and said temperature decrease button being positioned on opposite sides of a central transverse axis of said handle portion, and wherein said temperature increase button and said temperature decrease buttons are incorporated into oppositely positioned ends of a single elongated member positioned on and extending along said handle portion of said body such that said temperature decrease button and said temperature increase button are spaced apart and configured for having the hand positioned therebetween when the hand is grasping the handle portion of the body.

2. The assembly according to claim 1, further comprising a control power supply being electrically coupled to said actuator and said receiver, said control power supply comprising an electrical system in a building.

3. The assembly according to claim 1, further comprising a transmitter being coupled to said body, said transmitter being electrically coupled to said control circuit, said transmitter being in wireless electrical communication with said receiver, said transmitter communicating an increase signal to said receiver when said temperature increase button is manipulated such that said actuator is turned on to actuate in said first direction, said transmitter communicating a decrease signal to said receiver when said temperature decrease button is manipulated such that said actuator is turned on to actuate and said second direction.

4. The assembly according to claim 3, further comprising a remote power supply being positioned within said body, said remote power supply being electrically coupled to said control circuit, said remote power supply comprising at least one battery.

5. A water temperature control assembly comprising:
a control unit being configured to be attached to a fluid valve in a shower such that said control unit adjusts a temperature of water being delivered from the fluid valve, said control unit comprising:
an actuator being configured to be attached to the fluid valve, said actuator being turned on to actuate in a first direction wherein said actuator is configured to increase the temperature of the water delivered from the fluid valve, said actuator being turned on to actuate in a second direction wherein said actuator is configured to decrease the temperature of the water delivered from the fluid valve;
a receiver being coupled to said control unit, said receiver being electrically coupled to said actuator; and
a control power supply being electrically coupled to said actuator and said receiver, said control power supply comprising an electrical system in a building; and
a showerhead being configured to be fluidly coupled to the fluid valve in the shower for bathing, said showerhead being in wireless electrical communication with said control unit wherein said showerhead is configured to remotely control the temperature of the water, said showerhead comprising:
a body having a first end and a second end, said first end being configured to be fluidly coupled to a supply hose of the fluid valve, said second end having a plurality of apertures extending therethrough wherein said plurality of apertures is configured to release the water from the supply hose outwardly therefrom for bathing;
a control circuit being coupled to said body;
a temperature sensor being coupled to said body wherein said temperature sensor is configured to be in fluid communication with the water for detecting the temperature of the water, said temperature sensor being electrically coupled said control circuit;
a display being coupled to said body wherein said display is configured to be visible to a user, said display being electrically coupled to said control circuit, said display displaying indicia comprising numbers for indicating the temperature of the water;
a temperature increase button being coupled to said body, said temperature increase button being electrically coupled to said control circuit;
a temperature decrease button being coupled to said body, said temperature decrease buttons being electrically coupled said control circuit, each of said temperature increase button and said temperature decrease button being positioned on said handle portion in linear alignment parallel to a longitudinal central axis of said handle portion wherein each of said temperature increase button and said temperature decrease button are configured to be manipulated by a hand while grasping said handle portion, said temperature increase button and said temperature decrease button being positioned on opposite sides of a central transverse axis of said handle portion;
wherein said temperature increase button and said temperature decrease buttons are incorporated into oppositely positioned ends of a single elongated member positioned on and extending along said handle portion of said body such that said temperature decrease button and said temperature increase button are spaced apart and configured for having the hand positioned therebetween when the hand is grasping the handle portion of the body;
a transmitter being coupled to said body, said transmitter being electrically coupled to said control circuit, said transmitter being in wireless electrical communication with said receiver, said transmitter communicating an increase signal to said receiver when said temperature increase button is manipulated such that said actuator is turned on to actuate in said first direction, said transmitter communicating a decrease signal to said receiver when said temperature decrease button is manipulated such that said actuator is turned on to actuate in said second direction; and
a remote power supply being positioned within said body, said remote power supply being electrically coupled to said control circuit, said remote power supply comprising at least one battery.

* * * * *